United States Patent
Tanaka

(10) Patent No.: US 10,422,433 B2
(45) Date of Patent: Sep. 24, 2019

(54) VALVE APPARATUS AND AIR CONDITIONING APPARATUS

(71) Applicant: Mitsubishi Electric Corporation, Tokyo (JP)

(72) Inventor: Kosuke Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/758,772

(22) PCT Filed: Nov. 20, 2015

(86) PCT No.: PCT/JP2015/082793
§ 371 (c)(1),
(2) Date: Mar. 9, 2018

(87) PCT Pub. No.: WO2017/085891
PCT Pub. Date: May 26, 2017

(65) Prior Publication Data
US 2018/0283565 A1    Oct. 4, 2018

(51) Int. Cl.
*F16K 11/074*    (2006.01)
*F16K 3/04*    (2006.01)
(Continued)

(52) U.S. Cl.
CPC .............. *F16K 11/074* (2013.01); *F16K 3/04* (2013.01); *F25B 41/04* (2013.01); *F25B 41/046* (2013.01);
(Continued)

(58) Field of Classification Search
CPC .......... F16K 11/074; F16K 3/04; F16K 11/14; F16K 11/163; F16K 11/165;
(Continued)

(56) References Cited

U.S. PATENT DOCUMENTS

| 4,355,659 A * | 10/1982 | Kelchner | F16K 11/0856 137/597 |
| 6,505,647 B2 * | 1/2003 | Sasada | F16K 11/0743 137/625.43 |
| 8,122,735 B2 * | 2/2012 | Sakitani | F25B 9/06 62/192 |

FOREIGN PATENT DOCUMENTS

| JP | H10-281321 A | 10/1998 |
| JP | 5634849 B2 | 10/2014 |

OTHER PUBLICATIONS

International Search Report of the International Searching Authority dated Feb. 16, 2016 for the corresponding international application No. PCT/JP2015/082793 (and English translation).

* cited by examiner

*Primary Examiner* — Michael R Reid
(74) *Attorney, Agent, or Firm* — Posz Law Group, PLC

(57) ABSTRACT

A valve apparatus includes a valve main body, a shaft body, a first valve element, and a second valve element. The valve main body has a first depressed portion and a second depressed portion in a circular shape, and a first port, a second port, and a third port each communicating with the first depressed portion, and a fourth port and a fifth port each communicating with the second depressed portion. The first port is allowed to selectively communicate with one of the second port and the third port by closure of one of the second port and the third port by the first valve element rotating about an axial direction. A flow amount of a fluid flowing between the fourth port and the fifth port is allowed to be variable by closure of the fourth port by the second valve element rotating about the axial direction.

5 Claims, 12 Drawing Sheets

(51) Int. Cl.
*F25B 41/04* (2006.01)
*F25B 41/06* (2006.01)
*F25B 13/00* (2006.01)

(52) U.S. Cl.
CPC ............ *F25B 41/062* (2013.01); *F25B 13/00* (2013.01); *F25B 2313/0231* (2013.01); *F25B 2313/0233* (2013.01); *F25B 2313/0272* (2013.01); *F25B 2341/0653* (2013.01); *F25B 2500/18* (2013.01); *Y02B 30/72* (2013.01)

(58) Field of Classification Search
CPC .......... F16K 11/1661; F25B 2313/0233; F25B 2313/0272; F25B 2341/0653; Y10T 137/87708; Y10T 137/87772; Y10T 137/87732; Y10T 137/87161
USPC ................................ 137/862, 870, 865, 595
See application file for complete search history.

VALVE APPARATUS AND AIR CONDITIONING APPARATUS

CROSS REFERENCE TO RELATED APPLICATION

This application is a U.S. national stage application of PCT/JP2015/082793 filed on Nov. 20, 2015, the contents of which are incorporated herein by reference.

TECHNICAL FIELD

The present invention relates to a valve apparatus, and an air conditioning apparatus including the same.

BACKGROUND ART

Conventionally, in air conditioning apparatuses, valve apparatuses having an expansion valve and a four-way valve combined therein, such as a control valve described for example in Japanese Patent Laying-Open No. 10-281321 (PTD 1), have been proposed. In the control valve described in this publication, a motor operated valve which serves the function of an expansion valve includes a needle-shaped valve provided below a valve shaft, and a valve seat. When the needle-shaped valve moves up and down in an axial direction of the valve shaft, the needle-shaped valve is separated from and comes into contact with the valve seat. Thereby, the flow amount of the motor operated valve is adjusted.

CITATION LIST

Patent Document

PTD 1: Japanese Patent Laying-Open No. 10-281321

SUMMARY OF INVENTION

Technical Problem

In the control valve described in the above publication, since the needle-shaped valve moves up and down in the axial direction of the valve shaft, the size of the control valve in the axial direction of the valve shaft is increased. Therefore, it is difficult to downsize a valve apparatus.

The present invention has been made in view of the aforementioned problem, and one object of the present invention is to provide a valve apparatus which can be downsized, and an air conditioning apparatus including the same.

Solution to Problem

A valve apparatus of the present invention includes a valve main body, a shaft body, a first valve element, and a second valve element. The valve main body has a first depressed portion in a circular shape and a second depressed portion in a circular shape separated from the first depressed portion, and first to third ports each communicating with the first depressed portion, and fourth and fifth ports each communicating with the second depressed portion. The shaft body is placed in the valve main body and is rotatable about an axial direction. The first valve element is placed in the first depressed portion, is connected to the shaft body, and has a circular plate shape. The second valve element is placed in the second depressed portion, is connected to the shaft body to be located beside the first valve element along the axial direction, and has a circular plate shape. The first port is allowed to selectively communicate with one of the second port and the third port by closure of one of the second port and the third port by the first valve element rotating about the axial direction. A flow amount of a fluid flowing between the fourth port and the fifth port is allowed to be variable by closure of the fourth port by the second valve element rotating about the axial direction.

Advantageous Effects of Invention

According to the valve apparatus of the present invention, when the first valve element having the circular plate shape rotates in the first depressed portion in the circular shape about the axial direction of the shaft body, the first valve element closes one of the second port and the third port, and thereby, the first port is allowed to selectively communicate with one of the second port and the third port. Further, when the second valve element having the circular plate shape rotates in the second depressed portion in the circular shape about the axial direction of the shaft body, the second valve element closes the fourth port, and thereby, the flow amount of the fluid flowing between the fourth port and the fifth port is allowed to be variable. Therefore, since the first and the second valve elements do not move in the axial direction of the shaft body, the size of the valve apparatus in the axial direction of the shaft body can be reduced.

DESCRIPTION OF EMBODIMENTS

Hereinafter, an embodiment of the present invention will be described based on the drawings.

First, a configuration of a valve apparatus 1 in one embodiment of the present invention will be described with reference to FIGS. 1 to 3. The present embodiment will describe a case where valve apparatus 1 is applied to an air conditioning apparatus.

Figure 1:
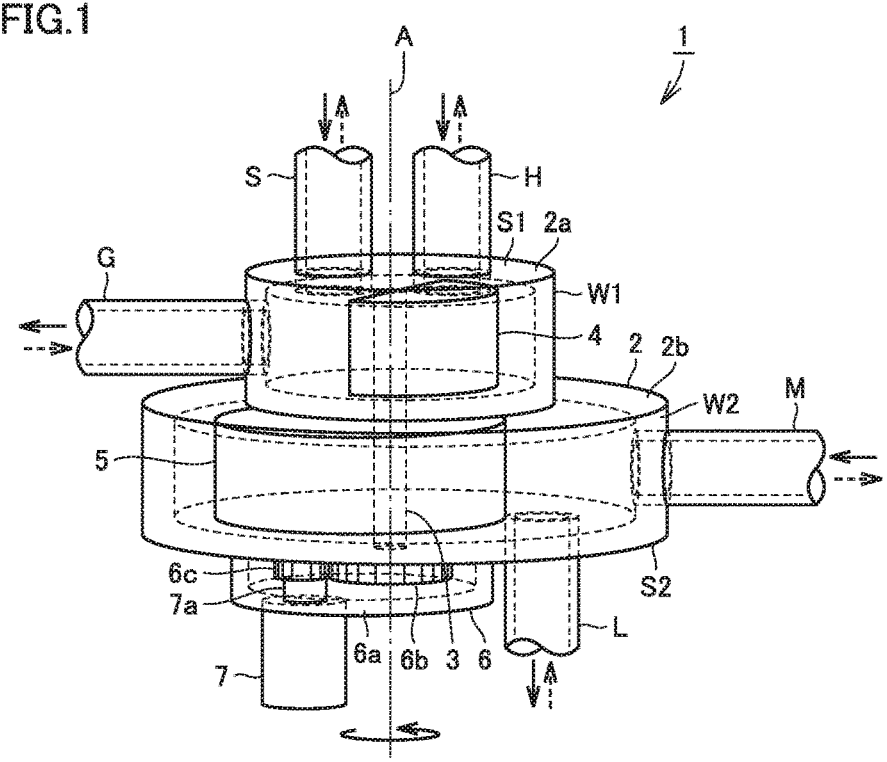
FIG. 1 is a perspective view schematically showing a configuration of a valve apparatus in one embodiment of the present invention.
Figure 2:
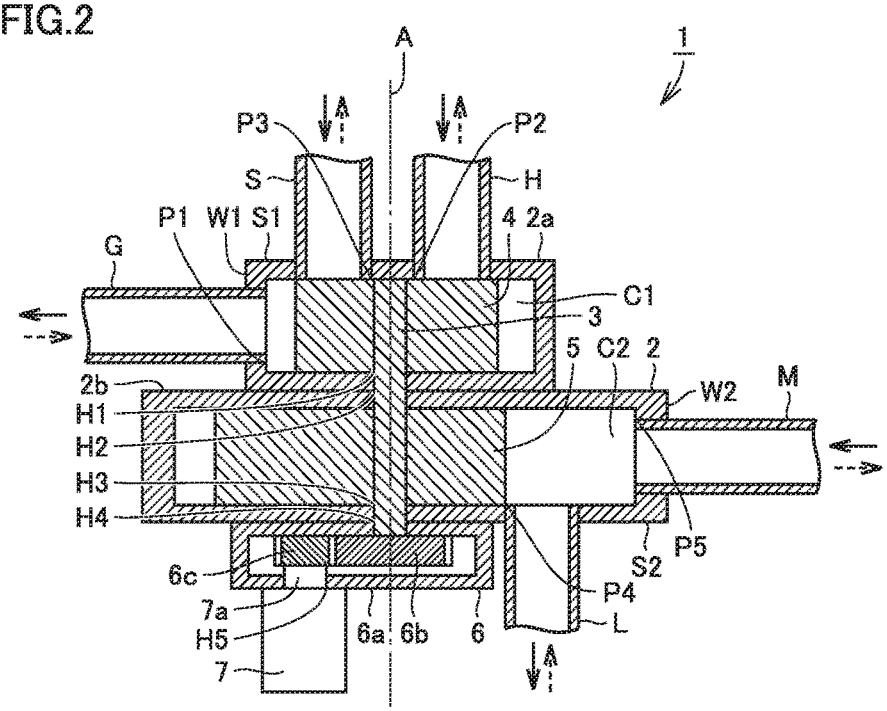
FIG. 2 is a cross sectional view schematically showing the configuration of the valve apparatus in one embodiment of the present invention.
Figure 3:
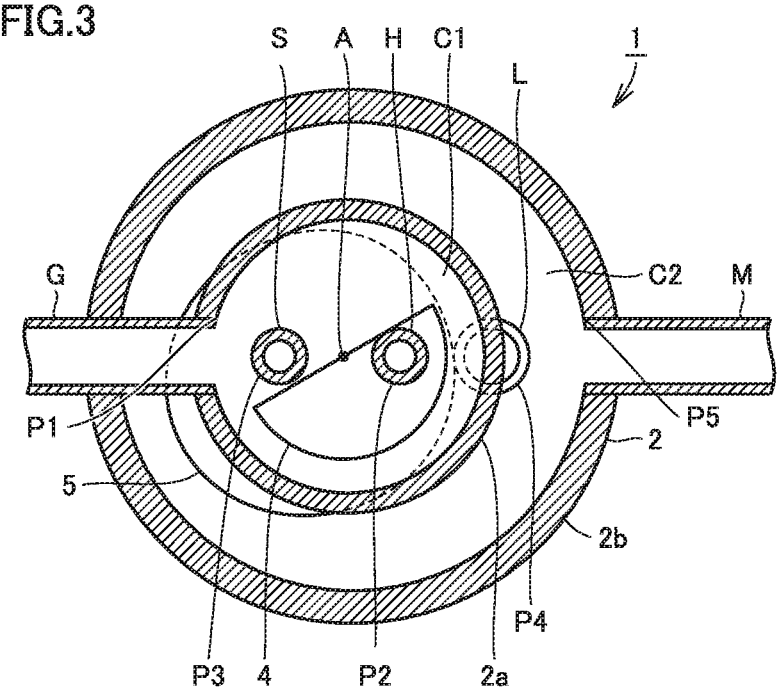
FIG. 3 is a plan view schematically showing the configuration of the valve apparatus of FIG. 1.

Mainly referring to FIGS. 1 and 2, valve apparatus 1 of the present embodiment is a compound valve apparatus having a three-way valve and an expansion valve integrated therein. In addition, valve apparatus 1 of the present embodiment is a rotary-type valve apparatus.

Valve apparatus 1 of the present embodiment mainly includes a valve main body 2, a shaft body 3, a first valve element 4, a second valve element 5, a gear box 6, and a motor 7. Shaft body 3, first valve element 4, and second valve element 5 are housed inside valve main body 2. First valve element 4 and second valve element 5 are each connected to shaft body 3. First valve element 4 and second valve element 5 are placed in an axial direction of shaft body 3. Shaft body 3 is connected to motor 7 via gear box 6. Subsequently, the configuration of valve apparatus 1 of the present embodiment will be described in detail.

Valve main body 2 has a first body portion 2a and a second body portion 2b. First body portion 2a and second body portion 2b each have a cylindrical shape. In the present embodiment, the diameter of first body portion 2a is smaller than the diameter of second body portion 2b. It should be noted that the diameter of first body portion 2a may be larger than the diameter of second body portion 2b. Further, the diameter of first body portion 2a may be the same as the diameter of second body portion 2b. First body portion 2a and second body portion 2b are stacked in the axial direction of shaft body 3. First body portion 2a is placed on second body portion 2b in the axial direction of shaft body 3.

A first through hole H1 is provided in a lower surface of first body portion 2a. A second through hole H2 is provided in an upper surface of second body portion 2b. A third through hole H3 is provided in a lower surface of second body portion 2b. Further, a fourth through hole H4 is provided in an upper surface of gear box 6. First to fourth through holes H1 to H4 are configured such that shaft body 3 can be inserted therethrough.

Valve main body 2 has a first depressed portion C1 and a second depressed portion C2. First depressed portion C1 and second depressed portion C2 are each in a circular shape. That is, first depressed portion C1 and second depressed portion C2 are each configured to be in a circular shape when viewed from the axial direction of shaft body 3. First depressed portion C1 is provided inside first body portion 2a. Second depressed portion C2 is provided inside second body portion 2b. Second depressed portion C2 is separated from first depressed portion C1.

Valve main body 2 has a first wall portion S and a second wall portion S2. First wall portion S1 and second wall portion S2 are each configured to intersect the axial direction of shaft body 3. In the axial direction of shaft body 3, first wall portion S1 constitutes one end portion (an upper end portion) of valve main body 2, and second wall portion S2 constitutes the other end portion (a lower end portion) of valve main body 2.

Valve main body 2 has a first circumferential wall W1 and a second circumferential wall W2. First circumferential wall W1 is configured to surround the circumference of first depressed portion C1. First circumferential wall W1 constitutes an outer circumferential wall of first body portion 2a. Second circumferential wall W2 is configured to surround the circumference of second depressed portion C2. Second circumferential wall W2 constitutes an outer circumferential wall of second body portion 2b.

Valve main body 2 has first to fifth ports P1 to P5. First to fifth ports P1 to P5 each penetrate an outer wall of valve main body 2. First to third ports P1 to P3 each communicate with first depressed portion C1. Fourth and fifth ports P4, P5 each communicate with second depressed portion C2. First port P1 is provided in first circumferential wall W1. Each of second port P2 and third port P3 is provided in first wall portion S1. Fourth port P4 is provided in second wall portion S2. Fifth port P5 is provided in second circumferential wall W2.

In the present embodiment, valve apparatus 1 is connected to a gas pipe G, a high pressure pipe H, a low pressure pipe S, a medium pressure pipe M, and a liquid pipe L. Refrigerant flows as indicated by solid line arrows and broken line arrows in FIG. 1. First port P1 is connected to gas pipe G. Specifically, gas pipe G is inserted into first port P1. Second port P2 is connected to high pressure pipe H. Specifically, high pressure pipe H is inserted into second port P2. Third port P3 is connected to low pressure pipe S. Specifically, low pressure pipe S is inserted into third port P3. Fourth port P4 is connected to liquid pipe L. Specifically, liquid pipe L is inserted into fourth port P4. Fifth port P5 is connected to medium pressure pipe M. Specifically, medium pressure pipe M is inserted into fifth port P5.

Shaft body 3 is placed in valve main body 2. Shaft body 3 is configured to be rotatable about the axial direction. That is, shaft body 3 is configured to be rotatable about an imaginary axis line A of shaft body 3. Shaft body 3 is connected to motor 7 via gear box 6. Shaft body 3 is inserted into first to fourth through holes H1 to H4. A gap between shaft body 3 and each of first to fourth through holes H1 to H4 is sealed. For example, the gap between shaft body 3 and each of first to fourth through holes H1 to H4 may be provided with a sealing member. Shaft body 3 is configured to be rotatable about the axial direction by a rotational driving force of motor 7.

First valve element 4 is placed in first depressed portion C1. First valve element 4 is connected to shaft body 3. First valve element 4 has a circular plate shape. Specifically, first valve element 4 has a semicircular plate shape, as shown in FIGS. 1 and 3. First valve element 4 is configured to be rotatable about the axial direction by rotation of shaft body 3. That is, first valve element 4 is configured to be rotatable in first depressed portion C1, about imaginary axis line A, in a circumferential direction of first depressed portion C1.

First valve element 4 is configured to be able to selectively partially close second port P2 and third port P3, by rotating about the axial direction of shaft body 3. An upper surface of first valve element 4 is configured to slidingly contact with an inner surface of first wall portion S1.

Second valve element 5 is placed in second depressed portion C2. Second valve element 5 is connected to shaft body 3 to be located beside first valve element 4 along the axial direction of shaft body 3. Second valve element 5 has a circular plate shape. Specifically, second valve element 5 has an elliptical shape, as shown in FIGS. 1 and 3. Second valve element 5 is configured to be rotatable about the axial direction by rotation of shaft body 3. That is, second valve element 5 is configured to be rotatable in second depressed portion C2, about imaginary axis line A, in a circumferential direction of second depressed portion C2. Second valve element 5 is configured to be able to continuously open and close fourth port P4 between a completely opened state and a completely closed state, by rotating about the axial direction of shaft body 3. A lower surface of second valve element 5 is configured to slidingly contact with an inner surface of second wall portion S2.

First valve element 4 and second valve element 5 can each be made of a material having a low heat conductivity. Thereby, heat exchange loss due to heat conduction can be reduced. As the material having a low heat conductivity, for example, brass, aluminum, stainless steel, or the like can be used.

Gear box 6 is attached to second wall portion S2 of valve main body 2. Gear box 6 has a case 6a, a gear wheel 6b, and a pinion 6c. Gear wheel 6b and pinion 6c are placed inside case 6a. Shaft body 3 is inserted into case 6a from fourth through hole H4 provided in an upper surface of case 6a. Inside case 6a, gear wheel 6b is connected to shaft body 3. Gear wheel 6b and shaft body 3 are placed to be concentric with each other.

A shaft 7a of motor 7 is inserted into case 6a from a fifth through hole H5 provided in a lower surface of case 6a. Inside case 6a, pinion 6c is connected to shaft 7a of motor 7. Pinion 6c and shaft 7a of motor 7 are placed to be concentric with each other.

Shaft body 3 and shaft 7a of the motor extend in directions opposite to each other with respect to gear wheel 6b and pinion 6c. Gear wheel 6b and pinion 6c are configured to mesh with each other. Therefore, when shaft 7a of motor 7 rotates, pinion 6c connected to shaft 7a rotates, and gear wheel 6b which meshes with pinion 6c rotates. Accordingly, shaft body 3 connected to gear wheel 6b rotates.

Motor 7 is connected to shaft body 3 via shaft 7a, pinion 6c, and gear wheel 6b. Motor 7 is configured to be able to rotate shaft body 3 about the axial direction. That is, motor 7 is configured to rotate shaft body 3 about the axial direction by transmitting the rotational driving force to shaft body 3 via shaft 7a, pinion 6c, and gear wheel 6b. Motor 7 is a pulse motor, for example.

Further, motor 7 may have a planetary gear mechanism connected to shaft 7a. Thereby, space can be saved. Further, a higher reduction gear ratio can be obtained with a smaller number of stages. A large torque can be transmitted. An input shaft and an output shaft can be coaxially placed.

In valve apparatus 1, first port P1 is allowed to selectively communicate with one of second port P2 and third port P3 by closure of one of second port P2 and third port P3 by first valve element 4 rotating about the axial direction of shaft body 3. First valve element 4 and first to third ports P1 to P3 constitute a three-way valve.

Further, the flow amount of a fluid flowing between fourth port P4 and fifth port P5 is allowed to be variable by closure of fourth port P4 by second valve element 5 rotating about the axial direction of shaft body 3. Second valve element 5 and fourth and fifth ports P4, P5 constitute an expansion valve.

Next, an air conditioning apparatus including valve apparatus 1 of the present embodiment will be described with reference to FIG. 4.

The air conditioning apparatus of the present embodiment mainly has an outdoor unit 10, an indoor unit 20, a flow divider 30, a first outdoor connecting pipe 41, a second outdoor connecting pipe 42, a first indoor connecting pipe 51, and a second indoor connecting pipe 52. Outdoor unit 10 and flow divider 30 are connected with each other by first outdoor connecting pipe 41 and second outdoor connecting pipe 42. Indoor unit 20 and flow divider 30 are connected with each other by first indoor connecting pipe 51 and second indoor connecting pipe 52. The air conditioning apparatus of the present embodiment is a two pipe-type air conditioning apparatus.

Outdoor unit 10 has a compressor 11, a four-way valve 12, an outdoor heat exchanger (a first heat exchanger) 13, first to fourth check valves 14a to 14d, and a pipe 15. Compressor 11, four-way valve 12, outdoor heat exchanger 13, and first to fourth check valves 14a to 14d are connected with one another by pipe 15.

Compressor 11 is configured to compress and discharge suctioned refrigerant. Four-way valve 12 is configured to switch a flow direction of the refrigerant discharged from compressor 11. Outdoor heat exchanger 13 is configured to perform heat exchange between the refrigerant flowing in outdoor heat exchanger 13 and outdoor air.

First check valve 14a is provided between outdoor heat exchanger 13 and first outdoor connecting pipe 41. First check valve 14a is configured to allow the refrigerant to flow only in a direction from outdoor heat exchanger 13 to first outdoor connecting pipe 41. Second check valve 14b is provided between four-way valve 12 and second outdoor connecting pipe 42. Second check valve 14b is configured to allow the refrigerant to flow only in a direction from second outdoor connecting pipe 42 to the four-way valve. Third check valve 14c is provided between four-way valve 12 and first outdoor connecting pipe 41. Third check valve 14c is configured to allow the refrigerant to flow only in a direction from four-way valve 12 to first outdoor connecting pipe 41. Fourth check valve 14d is provided between outdoor heat exchanger 13 and second outdoor connecting pipe 42. Fourth check valve 14d is configured to allow the refrigerant to flow only in a direction from second outdoor connecting pipe 42 to outdoor heat exchanger 13.

Indoor unit 20 has an indoor heat exchanger (a second heat exchanger) 21. Indoor heat exchanger 21 is configured to perform heat exchange between the refrigerant flowing in indoor heat exchanger 21 and indoor air. The air conditioning apparatus of the present embodiment includes three indoor units 20. These three indoor units 20 are illustrated as indoor units 20a to 20c, respectively. Indoor heat exchangers 21 of these indoor units 20a to 20c are illustrated as indoor heat exchangers 21a to 21c, respectively. First indoor connecting pipe 51 and second indoor connecting pipe 52 connected to these indoor units 20a to 20c are illustrated as first indoor connecting pipes 51a to 51c and second indoor connecting pipes 52a to 52c, respectively.

Flow divider 30 has valve apparatus 1, gas pipe G, high pressure pipe H, low pressure pipe S, medium pressure pipe M, liquid pipe L, a gas-liquid separator 31, a first electronically controlled expansion valve 32, and a second electronically controlled expansion valve 33. The air conditioning apparatus of the present embodiment includes three valve apparatuses 1. These three valve apparatuses 1 are illustrated as valve apparatuses 1a to 1c, respectively. These valve apparatuses 1a to 1c are each connected to gas pipe G, high pressure pipe H, low pressure pipe S, medium pressure pipe M, and liquid pipe L. Each of these valve apparatuses 1a to 1c is configured to be able to selectively connect gas pipe G with high pressure pipe H or low pressure pipe S. Further, each of these valve apparatuses 1a to 1c is configured to be able to connect medium pressure pipe M with liquid pipe L.

Gas pipes G connected to valve apparatuses 1a to 1c are connected to second indoor connecting pipes 52a to 52c, respectively. High pressure pipe H connected to each of valve apparatuses 1a to 1c is connected to gas-liquid separator 31. Gas-liquid separator 31 is configured to separate gas-liquid two-phase refrigerant flowing therein from first outdoor connecting pipe 41 into gas refrigerant and liquid refrigerant, and pass the gas refrigerant to high pressure pipe H and pass the liquid refrigerant to first electronically controlled expansion valve 32. First electronically controlled expansion valve 32 and second electronically controlled expansion valve 33 are configured to decompress the refrigerant. Low pressure pipe S connected to each of valve apparatuses 1a to 1c is connected to second outdoor connecting pipe 42. Medium pressure pipe M connected to each of valve apparatuses 1a to 1c is connected to second electronically controlled expansion valve 33. Liquid pipes L connected to valve apparatuses 1a to 1c are connected to first indoor connecting pipes 51a to 51c, respectively.

Figure 4:
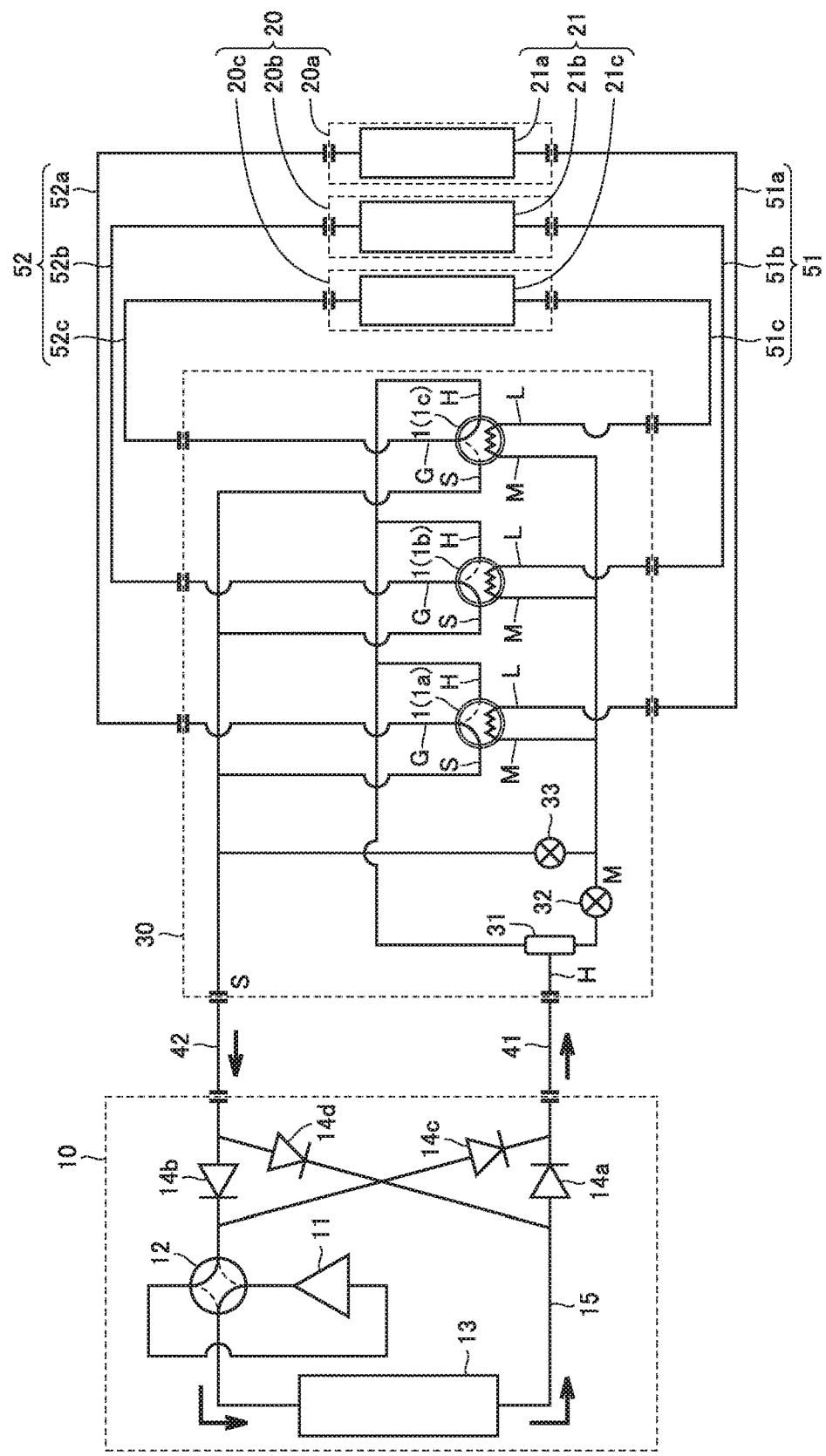
FIG. 4 is a refrigerant circuit diagram schematically showing a configuration of an air conditioning apparatus in one embodiment of the present invention.

As shown in FIGS. 2 and 4, first port P1 is connected to one end of indoor heat exchanger 21 via gas pipe G. Second port P2 is connected to a discharge side of compressor 11 via high pressure pipe H. Third port P3 is connected to a suction side of compressor 11 via low pressure pipe S. Fourth port P4 is connected to the other end of indoor heat exchanger 21 via liquid pipe L. Fifth port P5 is connected to outdoor heat exchanger 13 via medium pressure pipe M.

In the air conditioning apparatus of the present embodiment, since each of valve apparatuses 1a to 1c is connected to gas pipe G, high pressure pipe H, and low pressure pipe S, each of valve apparatuses 1a to 1c can switch a flow of the refrigerant between gas pipe G and high pressure pipe H or low pressure pipe S. Further, since each of valve apparatuses 1a to 1c is connected to medium pressure pipe M and liquid pipe L, each of valve apparatuses 1a to 1c can control the flow amount of the refrigerant flowing between medium pressure pipe M and liquid pipe L. Therefore, some of indoor units 20a to 20c can perform cooling operation, and the other indoor units can perform heating operation.

Next, operation of the air conditioning apparatus of the present embodiment will be described.

Referring to FIG. 4 again, a description will be given of a case where some of indoor units 20a to 20c perform cooling operation and the other indoor units perform heating operation in the air conditioning apparatus of the present embodiment. Specifically, a description will be given of a case where indoor units 20a, 20b perform cooling operation and indoor unit 20c performs heating operation.

As indicated by an arrow in the drawing, the refrigerant having a high temperature and a high pressure compressed by compressor 11 flows into outdoor heat exchanger 13 through four-way valve 12. In outdoor heat exchanger 13, the refrigerant exchanges heat with outdoor air. Thereby, the refrigerant is condensed and enters a gas-liquid two-phase state. The refrigerant in the gas-liquid two-phase state flows into flow divider 30 through first check valve 14a and first outdoor connecting pipe 41. The gas-liquid two-phase refrigerant flowing into flow divider 30 is transported to gas-liquid separator 31, and is separated into the gas refrigerant and the liquid refrigerant by gas-liquid separator 31.

The gas refrigerant separated by gas-liquid separator 31 flows into valve apparatus 1c through high pressure pipe H, and flows into indoor unit 20c through gas pipe G and second indoor connecting pipe 52c. The gas refrigerant flowing into indoor unit 20c exchanges heat with indoor air, is condensed and liquefied, and heats the inside of a room. The liquefied refrigerant flows into valve apparatus 1c through first indoor connecting pipe 51c and liquid pipe L, and is decompressed. The refrigerant decompressed by valve apparatus 1c flows into medium pressure pipe M.

The liquid refrigerant separated by gas-liquid separator 31 flows into each of valve apparatus 1 (1a) and valve apparatus 1 (1b) through first electronically controlled expansion valve 32 and medium pressure pipe M, and is decompressed. The refrigerant decompressed by valve apparatus 1 (1a) flows into indoor unit 20a through liquid pipe L and first indoor connecting pipe 51a. The refrigerant flowing into indoor unit 20a exchanges heat with indoor air, is evaporated and gasified, and cools the inside of a room. The gasified refrigerant flows into valve apparatus 1a through second indoor connecting pipe 52a and gas pipe G, and flows to low pressure pipe S.

Similarly, the refrigerant decompressed by valve apparatus 1 (1b) flows into indoor unit 20b through liquid pipe L and first indoor connecting pipe 51b. The refrigerant flowing into indoor unit 20b exchanges heat with indoor air, is evaporated and gasified, and cools the inside of a room. The gasified refrigerant flows into valve apparatus 1b through second indoor connecting pipe 52b and gas pipe G. and flows to low pressure pipe S.

The refrigerant flowing into low pressure pipe S flows into outdoor unit 10 through second outdoor connecting pipe 42. The refrigerant flowing into outdoor unit 10 flows into compressor 11 through four-way valve 12. Thereby, the refrigerant circulates through a refrigeration circuit.

In the air conditioning apparatus of the present embodiment, some of indoor units 20a to 20c can perform cooling operation and the other indoor units can perform heating operation, by switching valve apparatuses 1a to 1c in accordance with cooling-heating operation (operation which simultaneously performs cooling and heating). Further, all of indoor units 20a to 20c can perform cooling operation by switching four-way valve 12 and valve apparatuses 1a to 1c in accordance with cooling operation. Furthermore, all of indoor units 20a to 20c can perform heating operation by switching four-way valve 12 and valve apparatuses 1a to 1c in accordance with heating operation.

Next, operation of valve apparatus 1 of the present embodiment will be described with reference to FIGS. 5 to 14. It should be noted that, in FIGS. 5 to 14, the structure of valve apparatus 1 is indicated by solid lines, broken lines, and section lines as appropriate to make operation of first valve element 4 and second valve element 5 easier to see.

Figure 5:
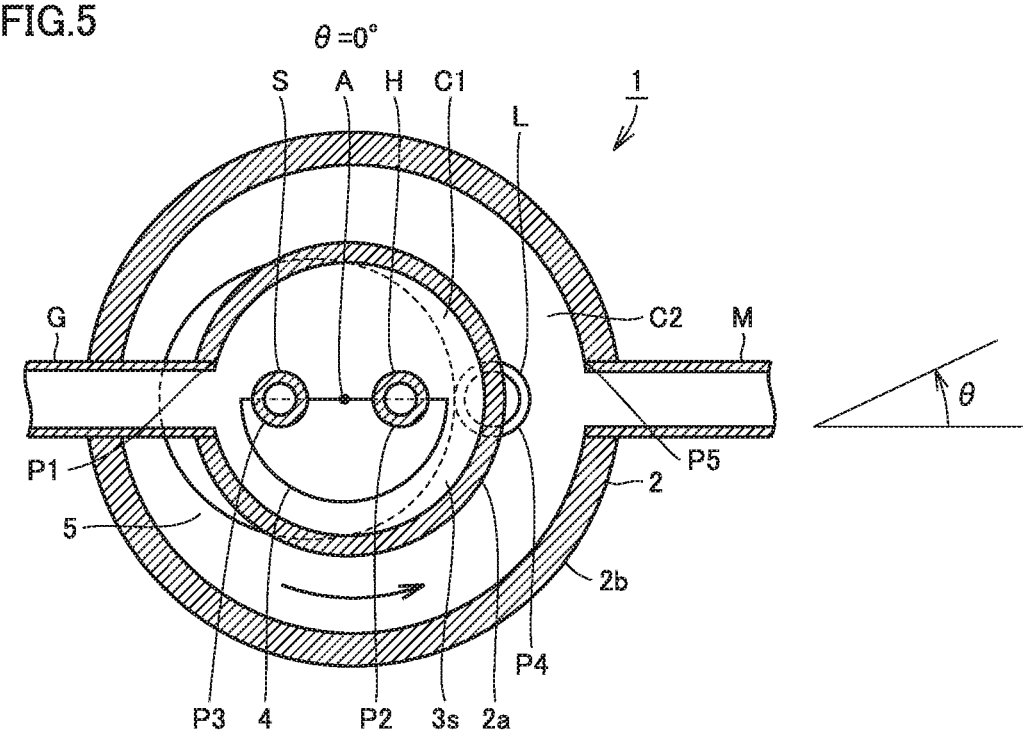
FIG. 5 is a plan view showing a state where a rotation angle of first and second valve elements of the valve apparatus of FIG. 3 is 0 degrees.

Referring to FIG. 5, this state represents a state where a rotation angle θ of first valve element 4 and second valve element 5 about imaginary axis line A is 0 degrees (θ=0). This rotation angle θ is a rotation angle in a counterclockwise direction. In this state, half of an opening area of second port P2 is closed by first valve element 4, and half of an opening area of third port P3 is closed by first valve element 4. Further, fourth port P4 is not closed by second valve element 5 and is opened (complete opened).

It should be noted that first port P1 is not closed by first valve element 4 and is opened (complete opened), and fifth port P5 is not closed by second valve element 5 and is opened (complete opened). This point is identical in FIGS. 5 to 12.

Figure 6:
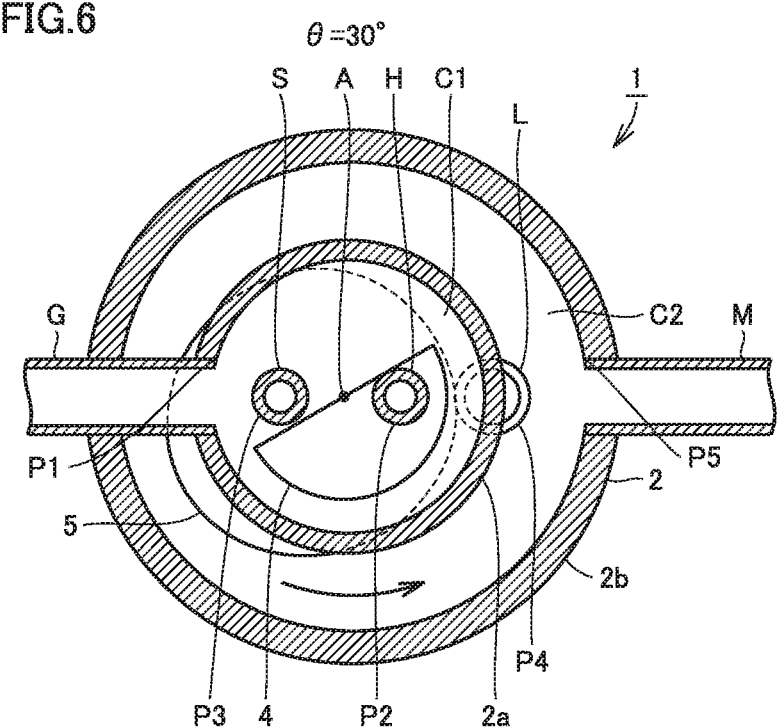
FIG. 6 is a plan view showing a state where the rotation angle of the first and second valve elements of the valve apparatus of FIG. 3 is 30 degrees.

Referring to FIG. 6, this state represents a state where rotation angle θ of first valve element 4 and second valve element 5 about imaginary axis line A is 30 degrees (θ=30°). That is, this state represents a state where first valve element 4 and second valve element 5 are rotated, from the state in FIG. 5, by 30° in the counterclockwise direction, as indicated by an arrow in the drawing. In this state, all of the opening area of second port P2 is closed by first valve element 4 (completely closed), and all of the opening area of third port P3 is not closed by first valve element 4 and is opened (complete opened). Further, fourth port P4 is not closed by second valve element 5 and is opened.

Figure 7:
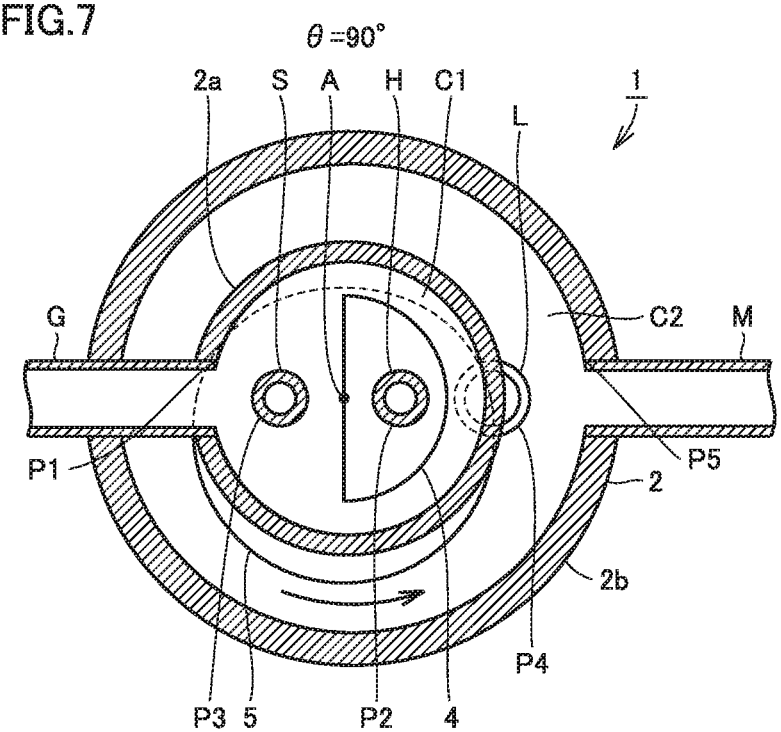
FIG. 7 is a plan view showing a state where the rotation angle of the first and second valve elements of the valve apparatus of FIG. 3 is 90 degrees.

Referring to FIG. 7, this state represents a state where rotation angle θ of first valve element 4 and second valve element 5 about imaginary axis line A is 90 degrees (θ=90°). That is, this state represents a state where first valve element 4 and second valve element 5 are further rotated, from the state in FIG. 6, by 60° in the counterclockwise direction, as indicated by an arrow in the drawing. In this state, all of the opening area of second port P2 is closed by first valve element 4 (completely closed), and all of the opening area of third port P3 is not closed by first valve element 4 and is opened (complete opened). Further, half of an opening area of fourth port P4 is closed by second valve element 5.

Figure 8:
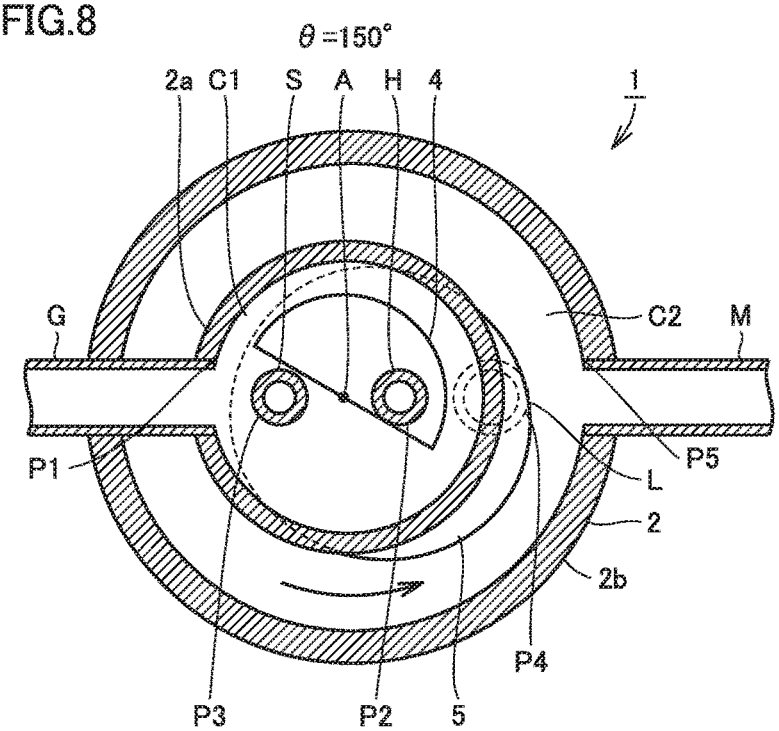
FIG. 8 is a plan view showing a state where the rotation angle of the first and second valve elements of the valve apparatus of FIG. 3 is 150 degrees.

Referring to FIG. 8, this state represents a state where rotation angle θ of first valve element 4 and second valve element 5 about imaginary axis line A is 150 degrees (0=150°). That is, this state represents a state where first valve element 4 and second valve element 5 are further rotated, from the state in FIG. 7, by 60° in the counterclockwise direction, as indicated by an arrow in the drawing. In this state, all of the opening area of second port P2 is closed by first valve element 4 (completely closed), and all of the opening area of third port P3 is not closed by first valve element 4 and is opened (complete opened). Further, all of the opening area of fourth port P4 is closed by second valve element 5 (completely closed).

Figure 9:
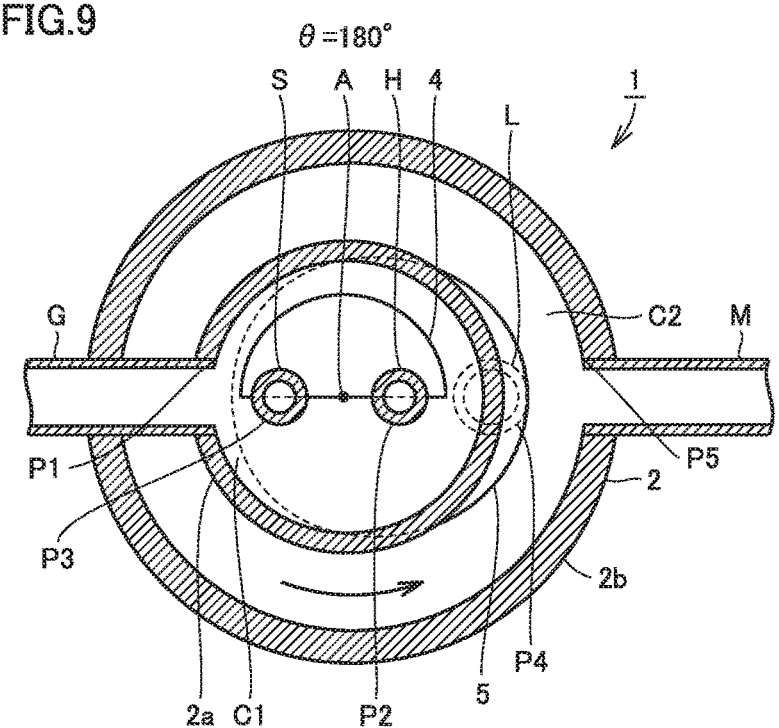
FIG. 9 is a plan view showing a state where the rotation angle of the first and second valve elements of the valve apparatus of FIG. 3 is 180 degrees.

Referring to FIG. 9, this state represents a state where rotation angle θ of first valve element 4 and second valve element 5 about imaginary axis line A is 180 degrees (θ=180°). That is, this state represents a state where first valve element 4 and second valve element 5 are further rotated, from the state in FIG. 8, by 30° in the counterclockwise direction, as indicated by an arrow in the drawing. In this state, half of the opening area of second port P2 is closed by first valve element 4, and half of the opening area of third port P3 is closed by first valve element 4. Further, all of the opening area of fourth port P4 is closed by second valve element 5 (completely closed).

Figure 10:
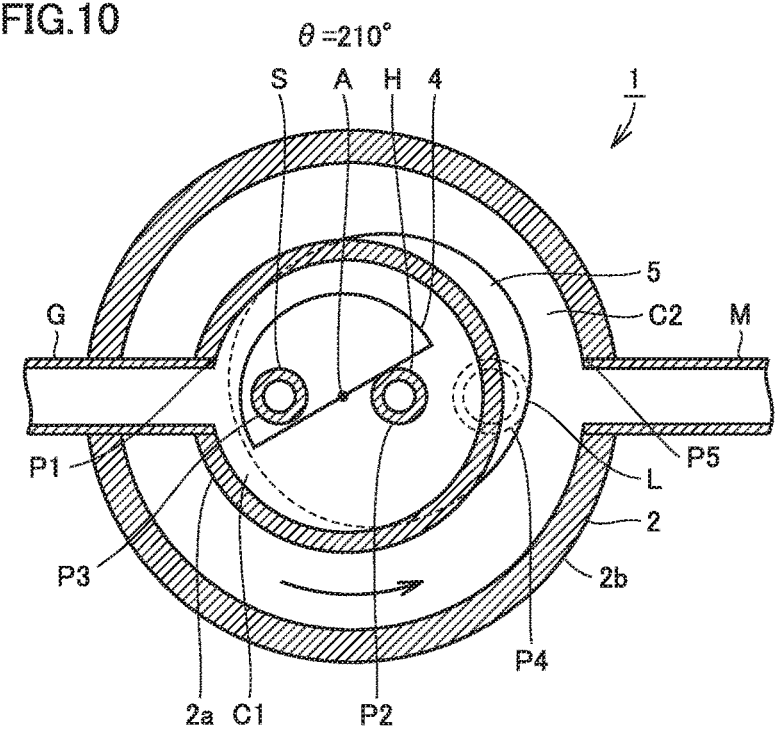
FIG. 10 is a plan view showing a state where the rotation angle of the first and second valve elements of the valve apparatus of FIG. 3 is 210 degrees.

Referring to FIG. 10, this state represents a state where rotation angle θ of first valve element 4 and second valve element 5 about imaginary axis line A is 210 degrees (θ=210°). That is, this state represents a state where first valve element 4 and second valve element 5 are further rotated, from the state in FIG. 9, by 30° in the counterclockwise direction, as indicated by an arrow in the drawing. In this state, all of the opening area of second port P2 is not closed by first valve element 4 and is opened (completely opened), and all of the opening area of third port P3 is closed by first valve element 4 (complete closed). Further, all of the opening area of fourth port P4 is closed by second valve element 5 (completely closed).

Figure 11:
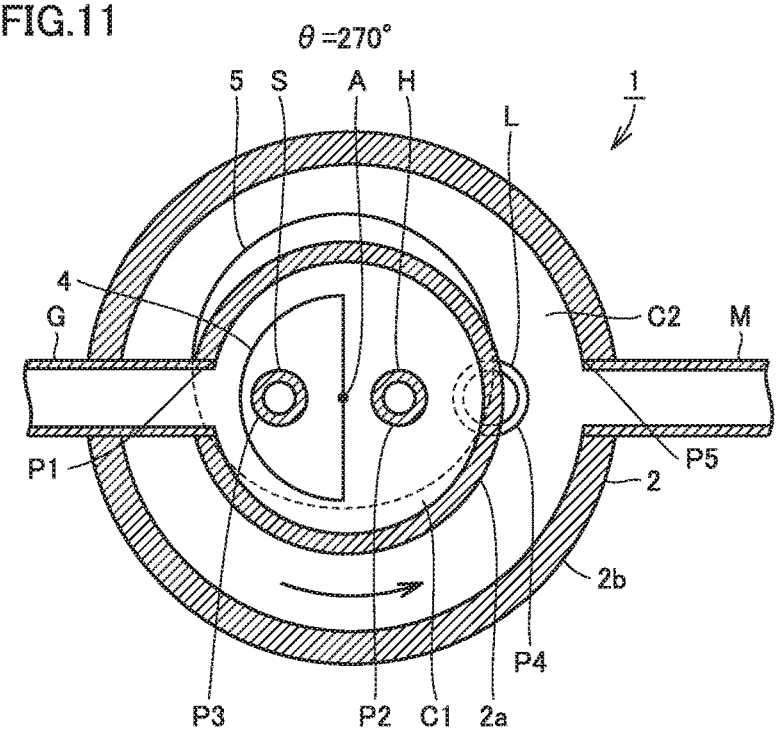
FIG. 11 is a plan view showing a state where the rotation angle of the first and second valve elements of the valve apparatus of FIG. 3 is 270 degrees.

Referring to FIG. 11, this state represents a state where rotation angle θ of first valve element 4 and second valve element 5 about imaginary axis line A is 270 degrees (θ=270°). That is, this state represents a state where first valve element 4 and second valve element 5 are further rotated, from the state in FIG. 10, by 60° in the counterclockwise direction, as indicated by an arrow in the drawing. In this state, all of the opening area of second port P2 is not closed by first valve element 4 and is opened (completely opened), and all of the opening area of third port P3 is closed by first valve element 4 (complete closed). Further, half of the opening area of fourth port P4 is closed by second valve element 5.

Figure 12:
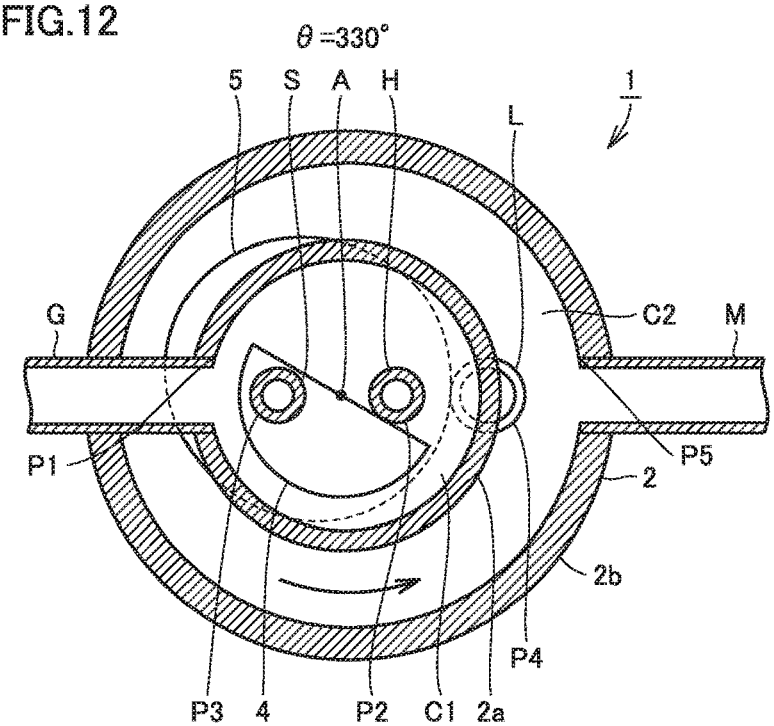
FIG. 12 is a plan view showing a state where the rotation angle of the first and second valve elements of the valve apparatus of FIG. 3 is 330 degrees.

Referring to FIG. 12, this state represents a state where rotation angle θ of first valve element 4 and second valve element 5 about imaginary axis line A is 330 degrees (θ=330°). That is, this state represents a state where first valve element 4 and second valve element 5 are further rotated, from the state in FIG. 11, by 60° in the counterclockwise direction, as indicated by an arrow in the drawing. In this state, all of the opening area of second port P2 is not closed by first valve element 4 and is opened (complete opened), and all of the opening area of third port P3 is closed by first valve element 4 (complete closed). Further, fourth port P4 is not closed by second valve element 5 and is opened (complete opened).

Figure 13:
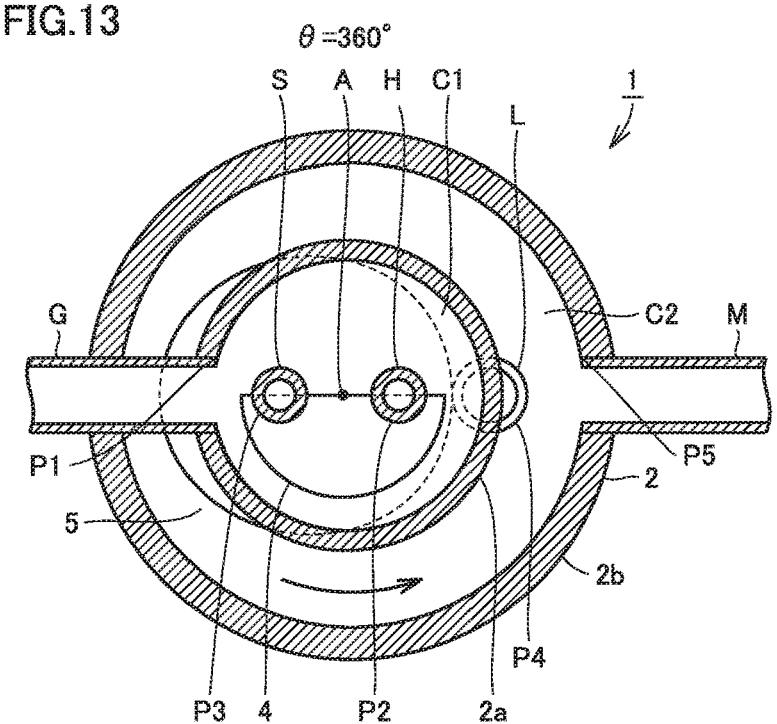
FIG. 13 is a plan view showing a state where the rotation angle of the first and second valve elements of the valve apparatus of FIG. 3 is 360 degrees.

Referring to FIG. 13, this state represents a state where rotation angle θ of first valve element 4 and second valve element 5 about imaginary axis line A is 360 degrees (θ=360°). That is, this state represents a state where first valve element 4 and second valve element 5 are further rotated, from the state in FIG. 12, by 30° in the counterclockwise direction, as indicated by an arrow in the drawing. In this state, half of the opening area of second port P2 is closed by first valve element 4, and half of the opening area of third port P3 is closed by first valve element 4. Further, fourth port P4 is not closed by second valve element 5 and is opened (complete opened).

As shown in FIGS. 5 and 6, when rotation angle θ of first valve element 4 and second valve element 5 is from 0° to 30°, the opening area of fourth port P4 is in a completely opened state. Further, when this rotation angle θ is from 0° to 30°, the opening area of second port P2 decreases continuously, and the opening area of third port P3 increases continuously.

Figure 14:
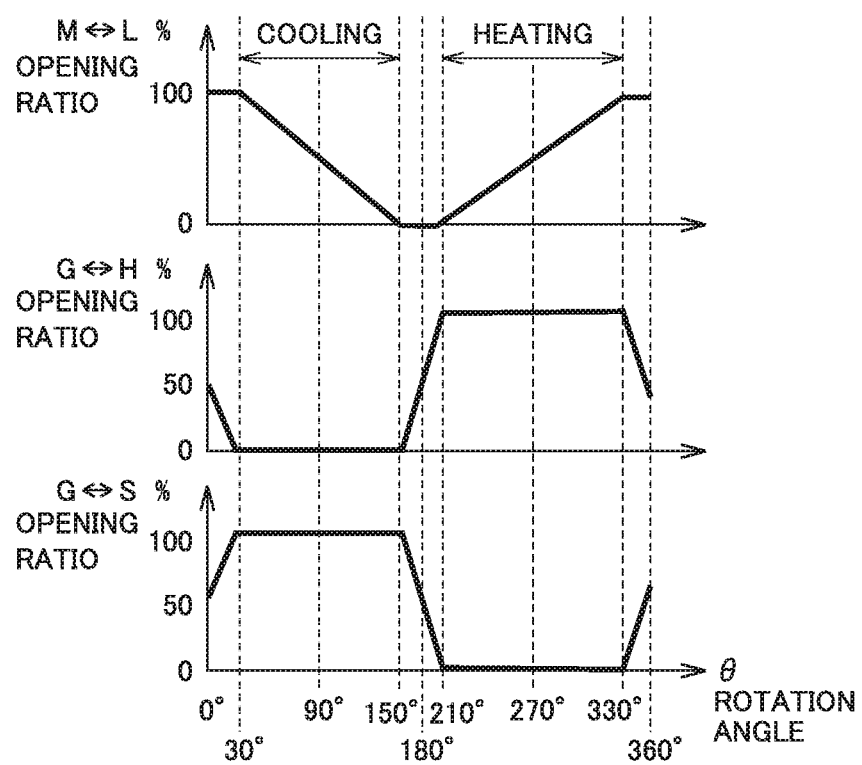
FIG. 14 is a view showing the relation between the rotation angle and the opening ratio.

Therefore, as shown in FIG. 14, when rotation angle θ of first valve element 4 and second valve element 5 is from 0° to 30°, the opening ratio of a flow path between medium pressure pipe M and liquid pipe L connected to fourth port P4 is 100%. Further, when this rotation angle θ is from 0° to 30°, the opening ratio of a flow path between gas pipe G connected to first port P1 and high pressure pipe H connected to second port P2 decreases continuously, and the opening ratio of a flow path between gas pipe G and low pressure pipe S connected to third port P3 increases continuously.

As shown in FIGS. 6 to 8, when rotation angle θ of first valve element 4 and second valve element 5 is from 30° to 150°, the opening area of fourth port P4 decreases continuously. Further, when this rotation angle θ is from 30° to 150°, the opening area of second port P2 is in a completely closed state, and the opening area of third port P3 is in a completely opened state.

Therefore, as shown in FIG. 14, when rotation angle θ of first valve element 4 and second valve element 5 is from 30° to 150°, the opening ratio of the flow path between medium pressure pipe M and liquid pipe L decreases continuously.

Thereby, the flow amount of the fluid flowing between fourth port P4 and fifth port P5 decreases. Further, when this rotation angle θ is from 30° to 150°, the opening ratio of the flow path between gas pipe G and high pressure pipe H is 0%, and the opening ratio of the flow path between gas pipe G and low pressure pipe S is 100%. The state where this rotation angle θ is from 30° to 150° represents the state of cooling operation.

As shown in FIGS. 8 to 10, when rotation angle θ of first valve element 4 and second valve element 5 is from 150° to 210°, the opening area of fourth port P4 is in a completely closed state. Further, when this rotation angle θ is from 150° to 210°, the opening area of second port P2 increases continuously, and the opening area of third port P3 decreases continuously.

Therefore, as shown in FIG. 14, when rotation angle θ of first valve element 4 and second valve element 5 is from 150° to 210°, the opening ratio of the flow path between medium pressure pipe M and liquid pipe L is 0%. Further, when this rotation angle θ is from 1500 to 2100, the opening ratio of the flow path between gas pipe G and high pressure pipe H increases continuously, and the opening ratio of the flow path between gas pipe G and low pressure pipe S decreases continuously.

As shown in FIGS. 10 to 12, when rotation angle θ of first valve element 4 and second valve element 5 is from 210° to 330°, the opening area of fourth port P4 increases continuously. Further, when this rotation angle θ is from 210° to 330°, the opening area of second port P2 is in a completely opened state, and the opening area of third port P3 is in a completely closed state.

Therefore, as shown in FIG. 14, when rotation angle θ of first valve element 4 and second valve element 5 is from 210° to 330°, the opening ratio of the flow path between medium pressure pipe M and liquid pipe L increases continuously. Thereby, the flow amount of the fluid flowing between fourth port P4 and fifth port P5 increases. Further, when this rotation angle θ is from 210° to 330°, the opening ratio of the flow path between gas pipe G and high pressure pipe H is 100%, and the opening ratio of the flow path between gas pipe G and low pressure pipe S is 0%. The state where this rotation angle θ is from 210° to 330° represents the state of heating operation. That is, when rotation angle θ reaches 210°, the operation state is switched to heating operation.

As shown in FIGS. 12 and 13, when rotation angle θ of first valve element 4 and second valve element 5 is from 330° to 360°, the opening area of fourth port P4 is in a completely opened state. Further, when this rotation angle θ is from 330° to 360°, the opening area of second port P2 decreases continuously, and the opening area of third port P3 increases continuously.

Therefore, as shown in FIG. 14, when rotation angle θ of first valve element 4 and second valve element 5 is from 330° to 360°, the opening ratio of the flow path between medium pressure pipe M and liquid pipe L is 100%. Further, when this rotation angle θ is from 330° to 360°, the opening ratio of the flow path between gas pipe G and high pressure pipe H decreases continuously, and the opening ratio of the flow path between gas pipe G and low pressure pipe S increases continuously.

In this manner, by the rotation of first valve element 4 and second valve element 5, opening and closing of fourth port P4 can be performed simultaneously with opening and closing of second port P2 or third port P3. Thereby, it is possible to simultaneously control the flow amount of the refrigerant flowing through the flow path between gas pipe G and high pressure pipe H or low pressure pipe S and the flow amount of the refrigerant flowing through the flow path between medium pressure pipe M and liquid pipe L. Therefore, it is possible to simultaneously control a flow direction of the refrigerant in the three-way valve and a throttle amount of the refrigerant in the expansion valve.

Further, when the opening ratio of the flow path between medium pressure pipe M and liquid pipe L increases, the amount of the refrigerant circulating into the indoor unit increases, and when the opening ratio of the flow path between medium pressure pipe M and liquid pipe L decreases, the amount of the refrigerant circulating into the indoor unit decreases.

Figure 15:
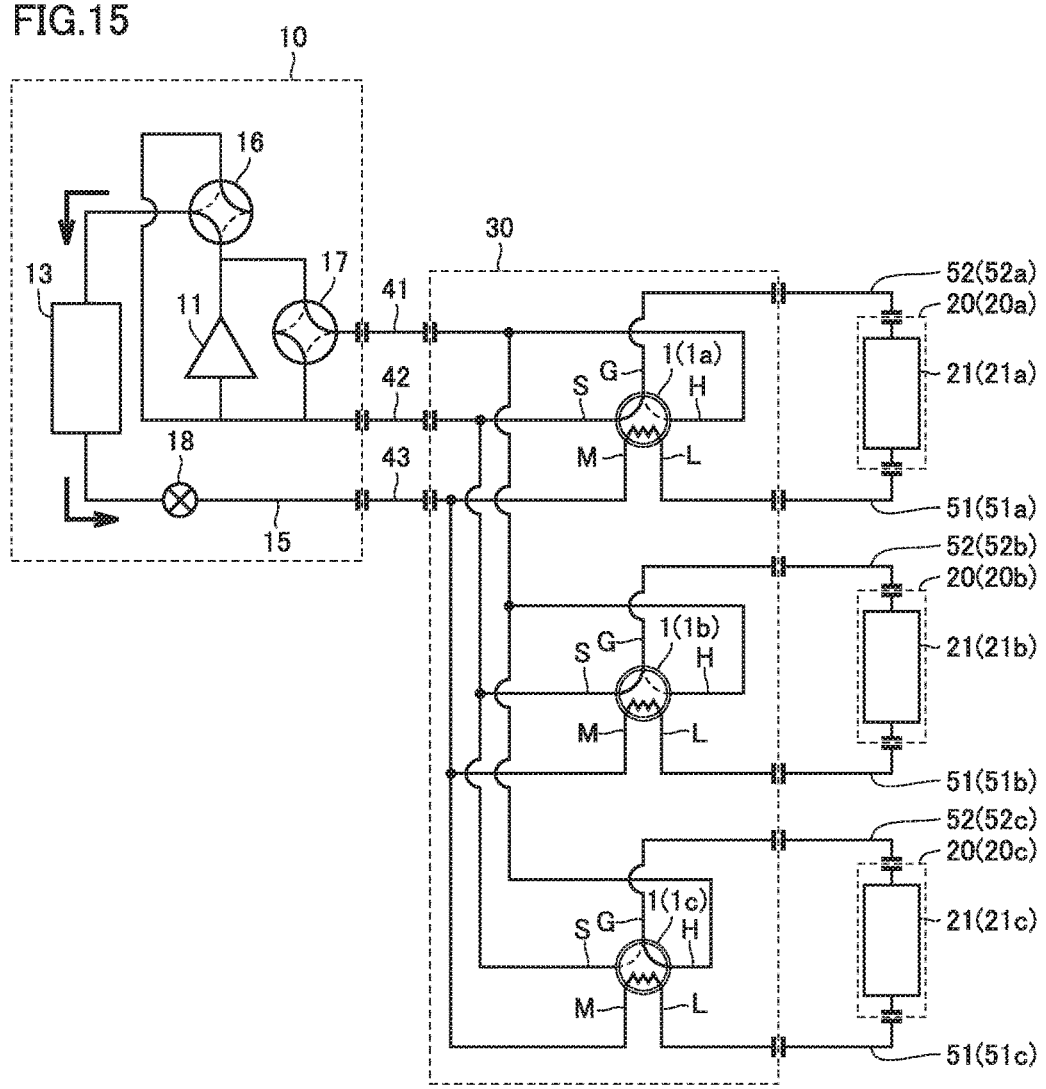
FIG. 15 is a refrigerant circuit diagram schematically showing a configuration of a variation of the air conditioning apparatus in one embodiment of the present invention.

Next, a variation of the air conditioning apparatus of the present embodiment will be described with reference to FIG. 15. In the following, components identical to those of the air conditioning apparatus of the present embodiment described above will be designated by the same reference numerals, and the description thereof will not be repeated, unless otherwise indicated.

The air conditioning apparatus of the present variation includes first to third outdoor connecting pipes 41 to 43 which connect outdoor unit 10 and flow divider 30 with each other. The air conditioning apparatus of the present variation is a three pipe-type air conditioning apparatus.

Outdoor unit 10 has compressor 11, outdoor heat exchanger 13, pipe 15, a first three-way valve 16, a second three-way valve 17, and an electronically controlled expansion valve 18. Compressor 11, outdoor heat exchanger 13, first three-way valve 16, second three-way valve 17, and electronically controlled expansion valve 18 are connected with one another by pipe 15. First three-way valve 16 and second three-way valve 17 are each configured to switch a flow direction of the refrigerant discharged from compressor 11. Electronically controlled expansion valve 18 is configured to decompress the refrigerant.

High pressure pipe H connected to each of valve apparatuses 1a to 1c is connected to first outdoor connecting pipe 41. Low pressure pipe S connected to each of valve apparatuses 1a to 1c is connected to second outdoor connecting pipe 42. Medium pressure pipe M connected to each of valve apparatuses 1a to 1c is connected to third outdoor connecting pipe 43.

Also in the air conditioning apparatus of the present variation, since each of valve apparatuses 1a to 1c is connected to gas pipe G, high pressure pipe H, and low pressure pipe S, each of valve apparatuses 1a to 1c can switch a flow of the refrigerant between gas pipe G and high pressure pipe H1 or low pressure pipe S. Further, since each of valve apparatuses 1a to 1c is connected to medium pressure pipe M and liquid pipe L, each of valve apparatuses 1a to 1c can control the flow amount of the refrigerant flowing between medium pressure pipe M and liquid pipe L. Therefore, some of indoor units 20a to 20c can perform cooling operation, and the other indoor units can perform heating operation.

Figure 16:
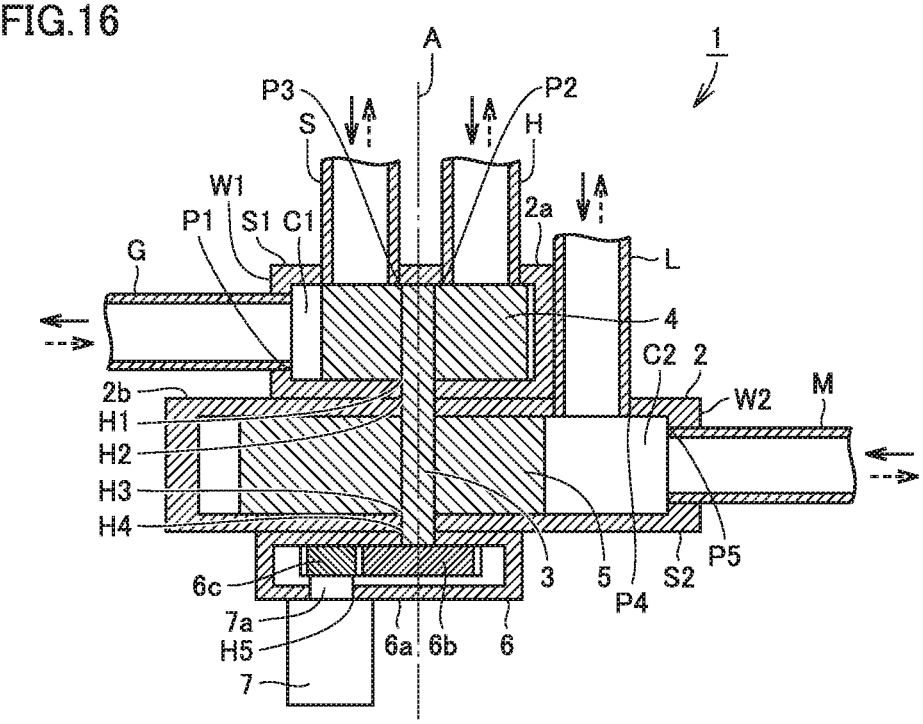
FIG. 16 is a cross sectional view schematically showing a configuration of a variation 1 of the valve apparatus in one embodiment of the present invention.

Next, a variation 1 of valve apparatus 1 of the present embodiment will be described with reference to FIG. 16. In the following, components identical to those of valve apparatus 1 of the present embodiment described above will be designated by the same reference numerals, and the description thereof will not be repeated, unless otherwise indicated. It should be noted that this applies to a variation 2 of valve apparatus 1 of the present embodiment described below.

In valve apparatus 1 of variation 1, fourth port P4 is provided in the upper surface of second body portion 2b. Accordingly, fourth port P4 can be placed in the same direction as second port P2 and third port P3. Further, liquid pipe L is connected to the upper surface of second body portion 2b. Accordingly, liquid pipe L can be placed in the same direction as high pressure pipe H and low pressure pipe S.

Figure 17:
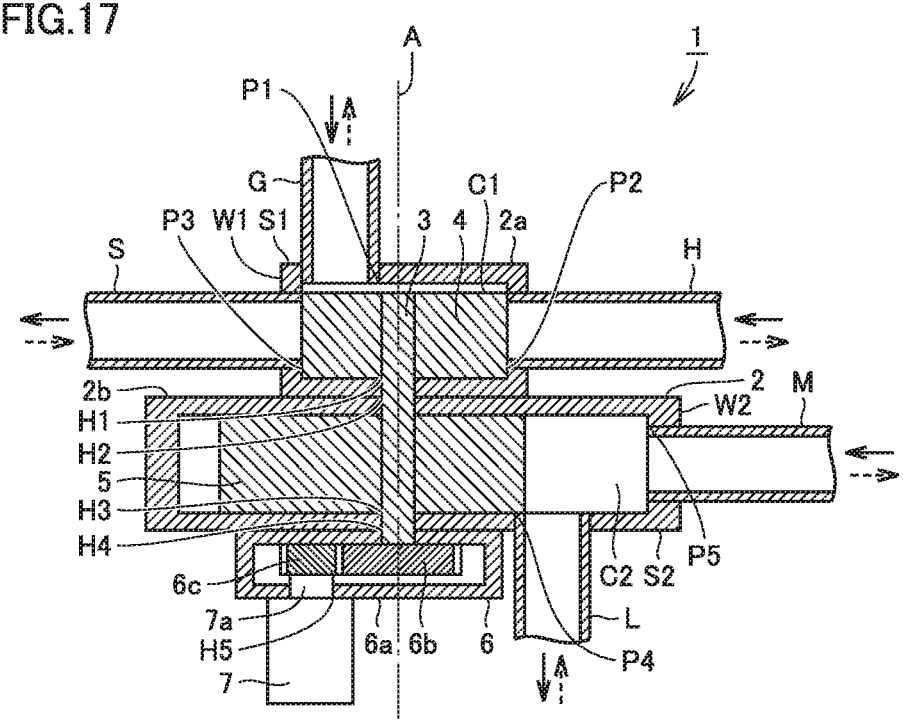
FIG. 17 is a cross sectional view schematically showing a configuration of a variation 2 of the valve apparatus in one embodiment of the present invention.
Figure 18:
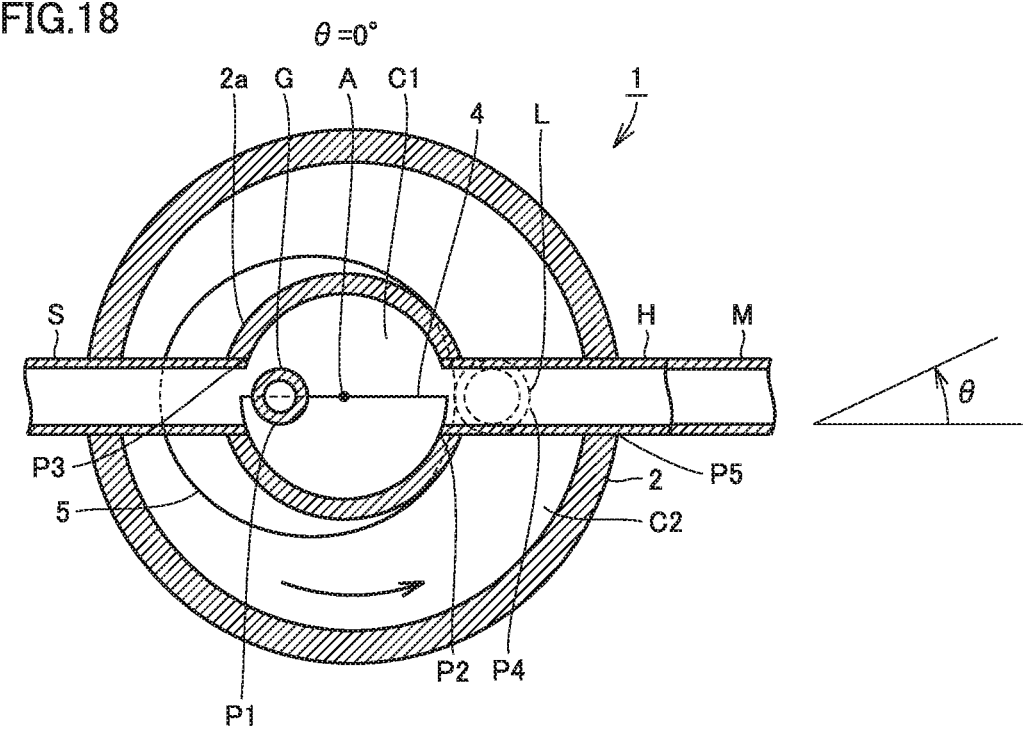
FIG. 18 is a plan view schematically showing the configuration of variation 2 of the valve apparatus of FIG. 17.

Subsequently, variation 2 of valve apparatus 1 of the present embodiment will be described with reference to FIGS. 17 and 18.

In valve apparatus 1 of variation 2, first port P1 is provided in an upper surface of first body portion 2a. Gas pipe G is connected to the upper surface of first body portion 2a. Second port P2 and third port P3 are provided in first circumferential wall W1. Second port P2 and third port P3 are placed to be opposite to each other. High pressure pipe H and low pressure pipe S are connected to first circumferential wall W1. The upper surface of first valve element 4 is placed with a gap from the inner surface of first wall portion S1. A side surface of first valve element 4 is configured to slidingly contact with an inner surface of first circumferential wall W1.

Accordingly, when first valve element 4 having the circular plate shape rotates in first depressed portion C1 in the circular shape about the axial direction of shaft body 3, the side surface of first valve element 4 closes one of second port P2 and third port P3. Thereby, first port P1 is allowed to selectively communicate with one of second port P2 and third port P3.

Next, the function and effect of the present embodiment will be described.

According to valve apparatus 1 of the present embodiment, when first valve element 4 having the circular plate shape rotates in first depressed portion C1 in the circular shape about the axial direction of shaft body 3, first valve element 4 closes one of second port P2 and third port P3, and thereby, first port P1 is allowed to selectively communicate with one of second port P2 and third port P3. Further, when second valve element 5 having the circular plate shape rotates in second depressed portion C2 in the circular shape about the axial direction of shaft body 3, second valve element 5 closes fourth port P4, and thereby, the flow amount of the fluid flowing between fourth port P4 and fifth port P5 is allowed to be variable. Therefore, since first valve element 4 and second valve element 5 do not move in the axial direction of shaft body 3, the size of valve apparatus 1 in the axial direction of shaft body 3 can be reduced.

Further, in valve apparatus 1 of the present embodiment, since first to third ports P1 to P3 each communicate with first depressed portion C in which first valve element 4 is placed, and fourth and fifth ports P4, P5 each communicate with second depressed portion C2 in which second valve element 5 is placed, the degree of freedom of placing first to fifth ports P1 to P5 can be improved. For example, when a valve apparatus is configured by providing a flow path in a lower surface of a valve element, and connecting a port to the flow path, the port should be provided in the lower surface of the valve element. In contrast, in valve apparatus 1 of the present embodiment, since first to third ports P1 to P3 each communicate with first depressed portion C1 in which first valve element 4 is placed, and fourth and fifth ports P4, P5 each communicate with second depressed portion C2 in which second valve element 5 is placed, first to fifth ports P1 to P5 can be provided in the upper surfaces, lower surfaces, side surfaces of first body portion 2a and second body portion 2b. Accordingly, the degree of freedom of placing first to fifth ports P1 to P5 can be improved.

Further, in valve apparatus 1 of the present embodiment, first valve element 4 and second valve element 5 each having the circular plate shape are connected to shaft body 3 to be located side by side along the axial direction. Accordingly, the size of first valve element 4 and second valve element 5 in the axial direction of shaft body 3 can be reduced. Thereby, vibration of first valve element 4 and second valve element 5 can be suppressed. For example, when a valve apparatus includes a needle-shaped valve provided below a valve shaft, and a valve seat, the size of the valve shaft in the axial direction is long, and thus the tip of the needle-shaped valve is likely to vibrate. Accordingly, noise is likely to be caused by contact of the tip of the needle-shaped valve with the valve seat. In contrast, in the present embodiment, since the size of first valve element 4 and second valve element 5 in the axial direction of shaft body 3 can be reduced, vibration of first valve element 4 and second valve element 5 can be suppressed. Thereby, noise reduction in valve apparatus 1 can be achieved.

In addition, in valve apparatus 1 of the present embodiment, valve apparatus 1 can be downsized by integrating the three-way valve and the expansion valve. Further, the cost of valve apparatus 1 can be reduced. Furthermore, since the internal volume of valve apparatus 1 is reduced, refrigerant capacity can be reduced.

According to valve apparatus 1 of the present embodiment, each of second port P2 and third port P3 is provided in first wall portion S1 of valve main body 2 which intersects the axial direction, and fourth port P4 is provided in second wall portion S2 of valve main body 2 which intersects the axial direction. Accordingly, second port P2 and third port P3 can be placed opposite to fourth port P4 in the axial direction. Therefore, valve main body 2 can be downsized when compared with a case where these ports are placed on the same side in the axial direction.

According to valve apparatus 1 of the present embodiment, first port P1 is provided in first circumferential wall W1 which surrounds the circumference of first depressed portion C1 in the circular shape, and fifth port P5 is provided in second circumferential wall W2 which surrounds the circumference of second depressed portion C2 in the circular shape. Accordingly, first port P1 and each of second port P2 and third port P3 can be placed in directions in which they intersect each other. Further, fifth port P5 and fourth port P4 can be placed in directions in which they intersect each other. Therefore, pressure loss of the fluid flowing between first port P1 and each of second port P2 and third port P3 can be reduced. Further, pressure loss of the fluid flowing between fourth port P4 and fifth port P5 can be reduced.

That is, when first port P1 is placed in the same direction as second port P2 and third port P3 and fifth port P5 is placed in the same direction as fourth port P4, a fluid flowing between first port P1 and each of second port P2 and third port P3 makes a U-turn, and a fluid flowing between fourth port P4 and fifth port P5 makes a U-turn. In contrast, in valve apparatus 1 of the present embodiment, first port P1 and each of second port P2 and third port P3 can be placed in directions in which they intersect each other, and fifth port P5 and fourth port P4 can be placed in directions in which they intersect each other. Accordingly, the fluid flowing between first port P1 and each of second port P2 and third port P3, and the fluid flowing between fourth port P4 and fifth port P5 each flow in an L shape. Therefore, pressure loss of the fluid flowing between first port P1 and each of second port P2 and third port P3 and the fluid flowing between fourth port P4 and fifth port P5 can be reduced.

According to valve apparatus 1 of the present embodiment, the pulse motor is configured to be able to rotate the shaft body about the axial direction. Since the pulse motor does not have to be continuously energized, power saving can be achieved in valve apparatus 1. That is, power consumption of valve apparatus 1 can be reduced.

According to valve apparatus 1 of the present embodiment, first valve element 4 has a semicircular plate shape. Second valve element 5 has an elliptical plate shape. Accordingly, first valve element 4 and second valve element 5 can each be formed in a simple shape.

The air conditioning apparatus of the present embodiment includes valve apparatus 1, compressor 11, and outdoor heat exchanger (first heat exchanger) 13 and indoor heat exchanger (second heat exchanger) 21 in which the refrigerant discharged from compressor 11 flows. First port P1 is connected to one end of indoor heat exchanger 21 via gas pipe G. Second port P2 is connected to a discharge side of compressor 11 via high pressure pipe H. Third port P3 is connected to a suction side of compressor 11 via low pressure pipe S. Fourth port P4 is connected to the other end of indoor heat exchanger 21 via liquid pipe L. Fifth port P5 is connected to outdoor heat exchanger 13 via medium pressure pipe M. Accordingly, an air conditioning apparatus including valve apparatus 1 which can be downsized can be provided.

Further, in the air conditioning apparatus of the present embodiment, indoor unit 20 is not provided with an expansion valve. Accordingly, indoor unit 20 can be downsized. Furthermore, noise inside a room can be reduced by placing an expansion valve outside the room.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST 1, 1a, 1b, 1c: valve apparatus; 2: valve main body; 3: shaft body; 4: first valve element; 5: second valve element; 6: gear box; 7: motor; 10: outdoor unit; 11: compressor; 12: four-way valve; 13: outdoor heat exchanger; 14a to 14d: first to fourth check valves; 15: pipe; 16: first three-way valve; 17: second three-way valve; 18: electronically controlled expansion valve; 20, 20a, 20b, 20c: indoor unit; 21, 21a, 21c: indoor heat exchanger; 30: flow divider, 31: gas-liquid separator, 32: first electronically controlled expansion valve; 33: second electronically controlled expansion valve, 41: first outdoor connecting pipe; 42: second outdoor connecting pipe; 43: third outdoor connecting pipe; 51, 51a, 51b, 51c: first indoor connecting pipe; 52, 52a, 52b, 52c: second indoor connecting pipe; C1: first depressed portion; C2: second depressed portion; G: gas pipe; H: high pressure pipe: L: liquid pipe; M: medium pressure pipe; P1 to P5: first to fifth ports; S: low pressure pipe; S1: first wall portion, S2: second wall portion; W1: first circumferential wall; W2: second circumferential wall.

The invention claimed is:

1. A valve apparatus comprising:
a valve main body having
a first depressed portion in a circular shape and a second depressed portion in a circular shape separated from the first depressed portion, and
a first port, a second port, and a third port each communicating with the first depressed portion, and a fourth port and a fifth port each communicating with the second depressed portion;
a shaft body placed in the valve main body and rotatable about an axial direction;
a first valve element placed in the first depressed portion, connected to the shaft body, and having a semicircular plate shape; and
a second valve element placed in the second depressed portion, connected to the shaft body to be located beside the first valve element along the axial direction, and having an elliptical plate shape,
the first port being allowed to selectively communicate with one of the second port and the third port by closure of one of the second port and the third port by the first valve element rotating about the axial direction, and
a flow amount of a fluid flowing between the fourth port and the fifth port being allowed to be variable by closure of the fourth port by the second valve element rotating about the axial direction.

2. The valve apparatus according to claim 1, wherein
each of the second port and the third port is provided in a first wall portion of the valve main body which intersects the axial direction, and
the fourth port is provided in a second wall portion of the valve main body which intersects the axial direction.

3. The valve apparatus according to claim 2, wherein
the first port is provided in a first circumferential wall which surrounds a circumference of the first depressed portion in the circular shape, and
the fifth port is provided in a second circumferential wall which surrounds a circumference of the second depressed portion in the circular shape.

4. The valve apparatus according to claim 1, further comprising a pulse motor connected to the shaft body, wherein
the pulse motor is configured to be able to rotate the shaft body about the axial direction.

5. An air conditioning apparatus comprising:
the valve apparatus according to claim 1;
a compressor; and
first and second heat exchangers in which refrigerant discharged from the compressor flows,
the first port being connected to one end of the second heat exchanger,
the second port being connected to a discharge side of the compressor,
the third port being connected to a suction side of the compressor,
the fourth port being connected to the other end of the second heat exchanger, and
the fifth port being connected to the first heat exchanger.

* * * * *